United States Patent
Cai et al.

(10) Patent No.: US 11,204,651 B2
(45) Date of Patent: Dec. 21, 2021

(54) KEYBOARD DEVICE AND KEY STRUCTURE THEREOF

(71) Applicant: Primax Electronics Ltd., Taipei (TW)

(72) Inventors: Liu-Bing Cai, Taipei (TW); Li-Qiang Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 76 days.

(21) Appl. No.: 16/799,712

(22) Filed: Feb. 24, 2020

(65) Prior Publication Data
US 2021/0181861 A1    Jun. 17, 2021

(30) Foreign Application Priority Data

Dec. 13, 2019   (CN) .......................... 201911281704.X

(51) Int. Cl.
| | |
|---|---|
| H01H 13/705 | (2006.01) |
| H01H 13/14 | (2006.01) |
| H01H 13/52 | (2006.01) |
| H01H 13/88 | (2006.01) |
| H01H 3/12 | (2006.01) |
| H01H 13/7065 | (2006.01) |
| G06F 3/02 | (2006.01) |

(52) U.S. Cl.
CPC ............. *G06F 3/0202* (2013.01); *H01H 3/12* (2013.01); *H01H 13/14* (2013.01); *H01H 13/52* (2013.01); *H01H 13/705* (2013.01); *H01H 13/88* (2013.01); *H01H 13/7065* (2013.01); *H01H 2213/014* (2013.01); *H01H 2233/07* (2013.01)

(58) Field of Classification Search
None
See application file for complete search history.

(56) References Cited

U.S. PATENT DOCUMENTS

| | | | | |
|---|---|---|---|---|
| 5,144,103 | A * | 9/1992 | Suwa | H01H 13/705 200/344 |
| 2004/0195082 | A1* | 10/2004 | Takeda | H01H 13/705 200/343 |
| 2014/0202841 | A1* | 7/2014 | Srbinovski | H01H 3/34 200/526 |
| 2017/0148589 | A1* | 5/2017 | Wang | H01H 13/7065 |

\* cited by examiner

*Primary Examiner* — Amy Onyekaba
*Assistant Examiner* — Amen W Bogale
(74) *Attorney, Agent, or Firm* — Kirton McConkie; Evan R. Witt

(57) ABSTRACT

A keyboard device includes a membrane circuit board and a key structure over the membrane circuit board. The key structure includes a keycap, a plunger structure, a key pedestal and an elastic element. The plunger structure is arranged between the keycap and the elastic element. At least a portion of the keycap is disposed within a pedestal dust-storage chamber of the key pedestal. At least a portion of the plunger structure is disposed within a guiding chamber of the key pedestal. Due to the relative location between the keycap, the plunger structure and the key pedestal, the path of the dust to enter the guiding chamber is extended or blocked. Consequently, the dust-proof efficacy is enhanced.

17 Claims, 10 Drawing Sheets

KEYBOARD DEVICE AND KEY STRUCTURE THEREOF

FIELD OF THE INVENTION

The present invention relates to a computer peripheral device, and more particularly to an input device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices.

The structures and the functions of a conventional keyboard device will be illustrated as follows. Please refer to FIGS. 1, 2, 3 and 4. FIG. 1 is a schematic perspective view illustrating the outer appearance of a conventional keyboard device. FIG. 2 is a schematic perspective view illustrating a portion of the keyboard device as shown in FIG. 1. FIG. 3 is a schematic exploded view illustrating a portion of the keyboard device as shown in FIG. 1. FIG. 4 is a schematic cross-sectional view illustrating a portion of the keyboard device as shown in FIG. 1 and taken along the line AA. For succinctness, only one key structure and the related components are shown in FIGS. 2, 3 and 4. In practice, the keyboard device comprises one or more than one key structure.

The conventional keyboard device 1 comprises plural key structures 11, a membrane circuit board 12 and a base plate 13. The membrane circuit board 12 is located under the plural key structures 11. The plural key structures 11 and the membrane circuit board 12 are supported by the base plate 13. The membrane circuit board 12 comprises plural membrane switches 121 corresponding to the plural key structures 11. Each key structure 11 comprises a keycap 111, a key pedestal 112 and an elastic element 113. The key pedestal 112 comprises an accommodation space 1121. At least a portion of the keycap 111 is movable within the accommodation space 1121. Moreover, the keycap 111 is guided by the accommodation space 1121. The elastic element 113 is located under the keycap 111. Moreover, a post part 1111 is protruded downwardly from a bottom surface of the keycap 111 and contacted with the elastic element 113.

While the keycap 111 is depressed, the keycap 111 is moved downwardly relative to the base plate 13. As the post part 1111 is moved downwardly to compress the elastic element 113, the corresponding membrane switch 121 of the membrane circuit board 12 is contacted and pushed by a contacting part 1131 of the elastic element 113. Consequently, the corresponding membrane switch 121 is triggered, and the keyboard device 1 generates a corresponding key signal. When the keycap 111 is no longer depressed, the keycap 111 is moved upwardly relative to the base plate 13 in response to an elastic force of the elastic element 113. Consequently, the keycap 111 is returned to its original position. Moreover, the keycap 111 comprises a lateral wing part 1112. The lateral wing part 1112 is protruded from the post part 1111 along a lateral direction. The key pedestal 112 comprises a position-limiting structure 1122. The position-limiting structure 1122 is formed in the key pedestal 112 and over the lateral wing part 1112. Due to the interference between the position-limiting structure 1122 and the lateral wing part 1112, the position of the keycap 111 can be limited. Consequently, the keycap 111 is not detached from the key pedestal 112.

Generally, the use environment of the keyboard device 1 is not fixed. For example, the keyboard device 1 may be used in an office, in home or in a public internet cafe. Although the dust concentration varies in different use environments, dust is readily accumulated on the keyboard device 1. The dust accumulation occurs in the place where sand and dust are severe or the concentration of suspended particulates (PM2.5) is too high (e.g., in India). As shown in FIG. 4, the dust enters the keyboard device 1 along the path D1 indicated by the arrowed direction. The dust accumulation may cause the interference and the unsmooth operation of the key structure 11 and affect the operating feel of the user. Moreover, if the elastic element 113 is aged prematurely, the poor contact situation occurs and the use life of the keyboard device 1 is shortened. In other words, the conventional keyboard device 1 and the conventional key structure 11 need to be further improved.

SUMMARY OF THE INVENTION

An object of the present invention provides a key structure with dust-proof efficacy.

Another object of the present invention provides a keyboard device with the key structure in order to increase the use life of the keyboard device.

In accordance with an aspect of the present invention, a key structure is provided. The key structure includes a keycap, a plunger structure, a key pedestal and an elastic element. The plunger structure includes a post part and a plunger dust-storage chamber. The plunger dust-storage chamber opens to an upward side. The post part is connected between the keycap and the plunger dust-storage chamber. The key pedestal includes an outer wall, a vertical partition wall and a horizontal partition wall. A pedestal dust-storage chamber and a guiding chamber are defined by the outer wall, the vertical partition wall and the horizontal partition wall collaboratively. A first end of the vertical partition wall is connected with the horizontal partition wall. A second end of the vertical partition wall is bent toward the plunger dust-storage chamber. The elastic element is located under the plunger structure, and includes a contacting part. While the keycap is depressed, the keycap is moved downwardly within the pedestal dust-storage chamber, the plunger structure is moved downwardly within the guiding chamber, and the elastic element is compressed. Consequently, a membrane switch of a keyboard device is triggered by the contacting part.

In accordance with another aspect of the present invention, a keyboard device is provided. The keyboard device includes a membrane circuit board and a key structure. The membrane circuit board includes a membrane switch and a key structure corresponding to the membrane switch. The key structure includes a keycap, a plunger structure, a key pedestal and an elastic element. The plunger structure includes a post part and a plunger dust-storage chamber. The plunger dust-storage chamber opens to an upward side. The post part is connected between the keycap and the plunger dust-storage chamber. The key pedestal includes an outer wall, a vertical partition wall and a horizontal partition wall. A pedestal dust-storage chamber and a guiding chamber are defined by the outer wall, the vertical partition wall and the horizontal partition wall collaboratively. A first end of the vertical partition wall is connected with the horizontal partition wall. A second end of the vertical partition wall is bent toward the plunger dust-storage chamber. The elastic element is located under the plunger structure, and includes a contacting part. While the keycap is depressed, the keycap is moved downwardly within the pedestal dust-storage chamber, the plunger structure is moved downwardly within the guiding chamber, and the elastic element is compressed. Consequently, the membrane switch is triggered by the contacting part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
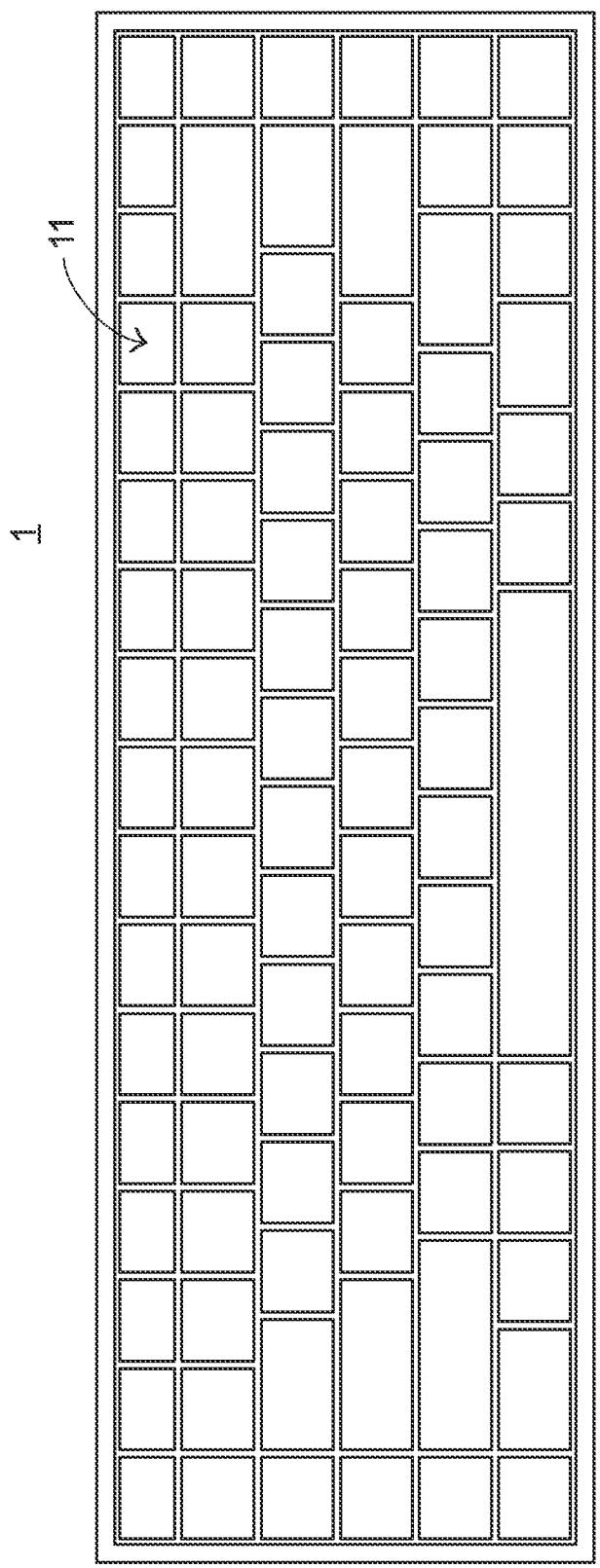
FIG. 1 is a schematic perspective view illustrating the outer appearance of a conventional keyboard device.
Figure 2:
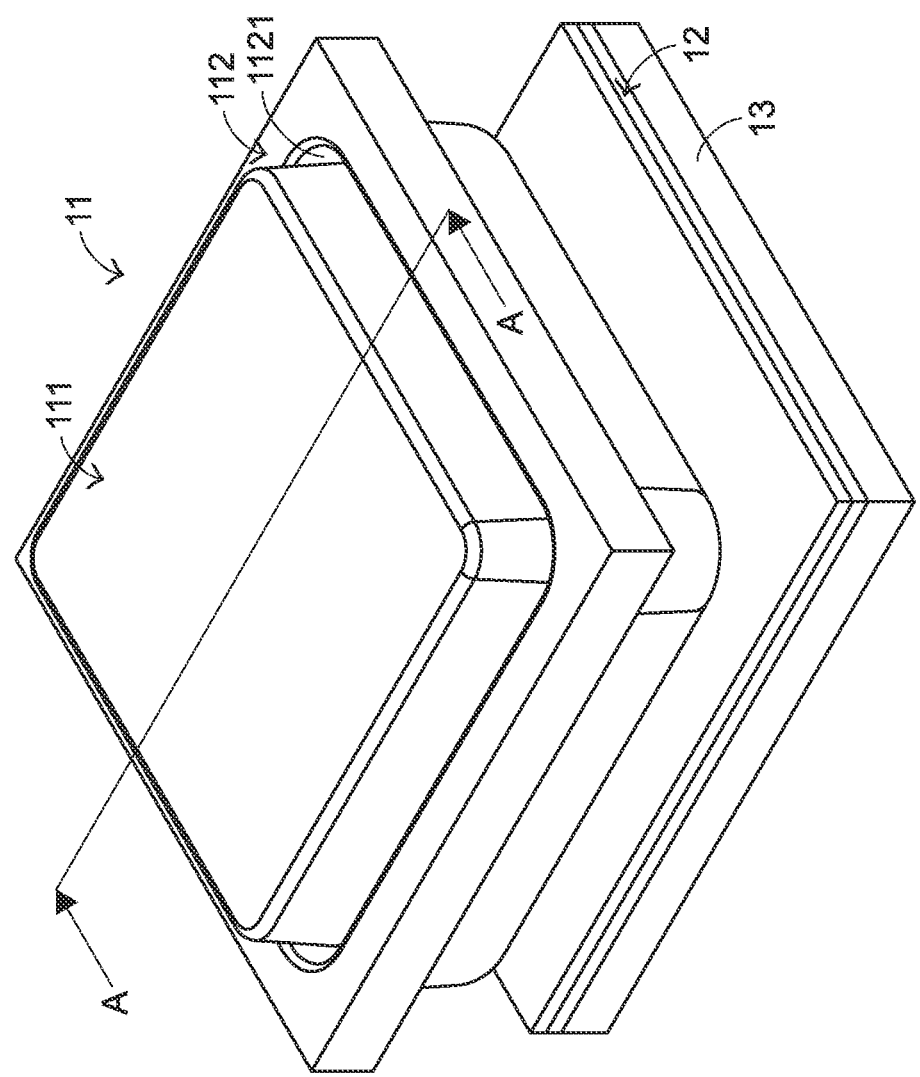
FIG. 2 is a schematic perspective view illustrating a portion of the keyboard device as shown in FIG. 1.
Figure 3:
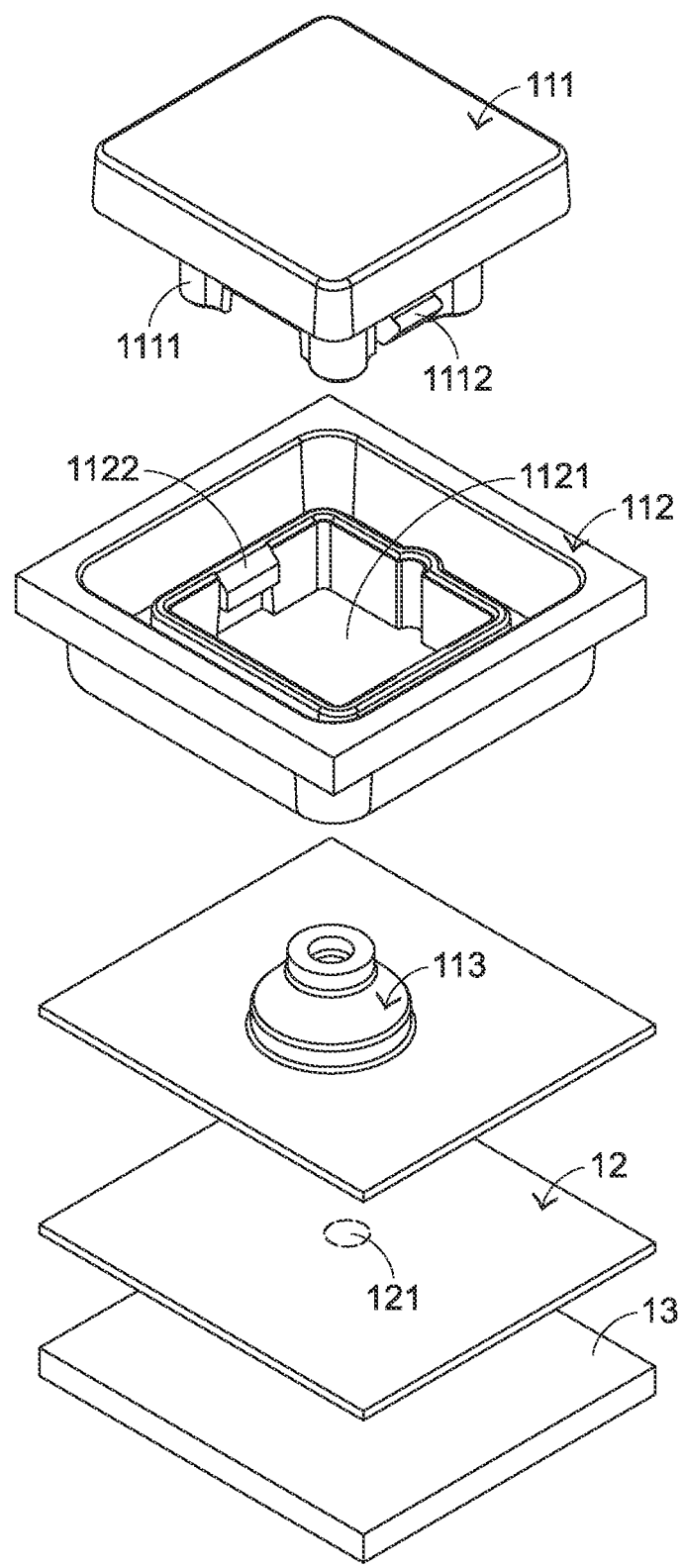
FIG. 3 is a schematic exploded view illustrating a portion of the keyboard device as shown in FIG. 1.
Figure 4:
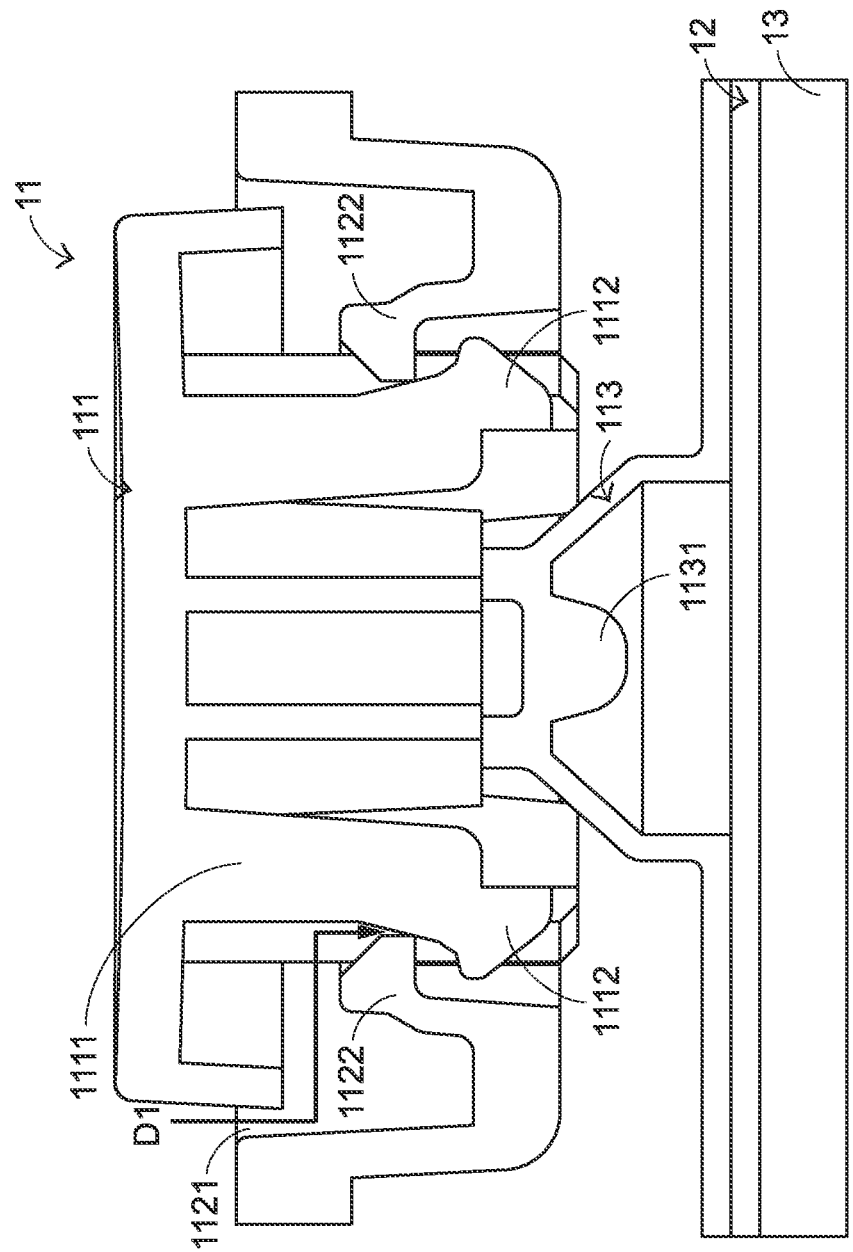
FIG. 4 is a schematic cross-sectional view illustrating a portion of the keyboard device as shown in FIG. 1 and taken along the line AA.

The embodiments of present invention will be described more specifically with reference to the following drawings. Generally, in the drawings and specifications, identical or similar components are designated by identical numeral references. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 5:
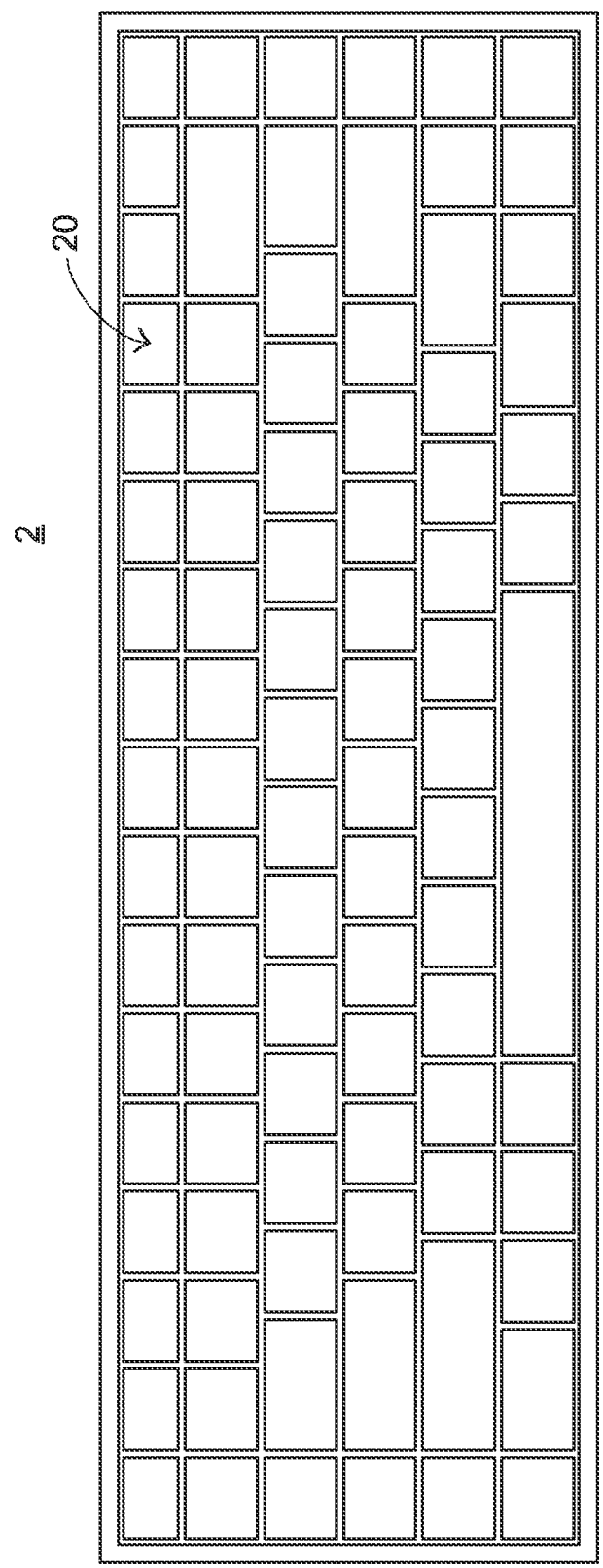
FIG. 5 is a schematic perspective view illustrating the outer appearance of a keyboard device according to an embodiment of the present invention.
Figure 6:
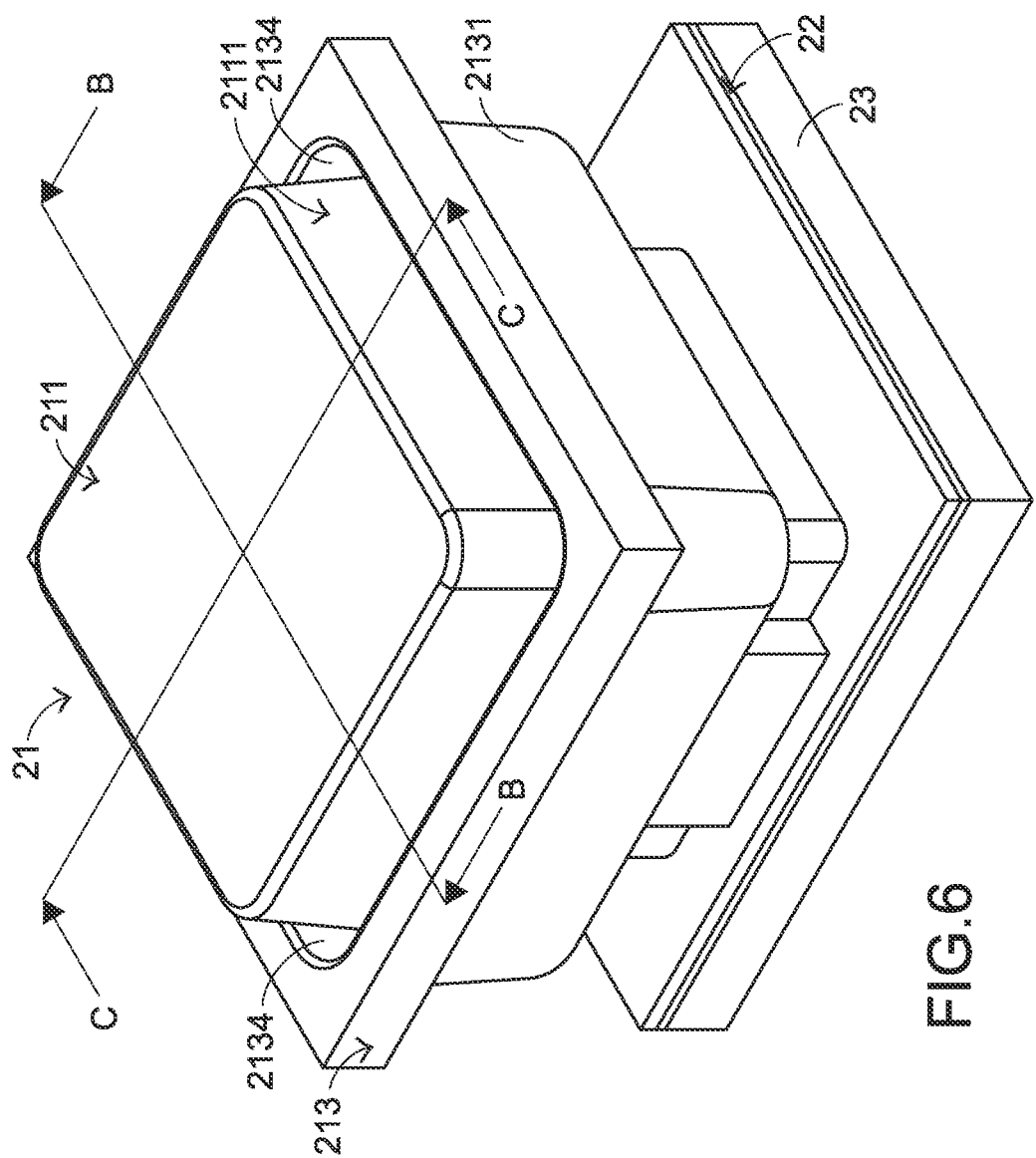
FIG. 6 is a schematic perspective view illustrating a portion of the keyboard device as shown in FIG. 5.
Figure 7:
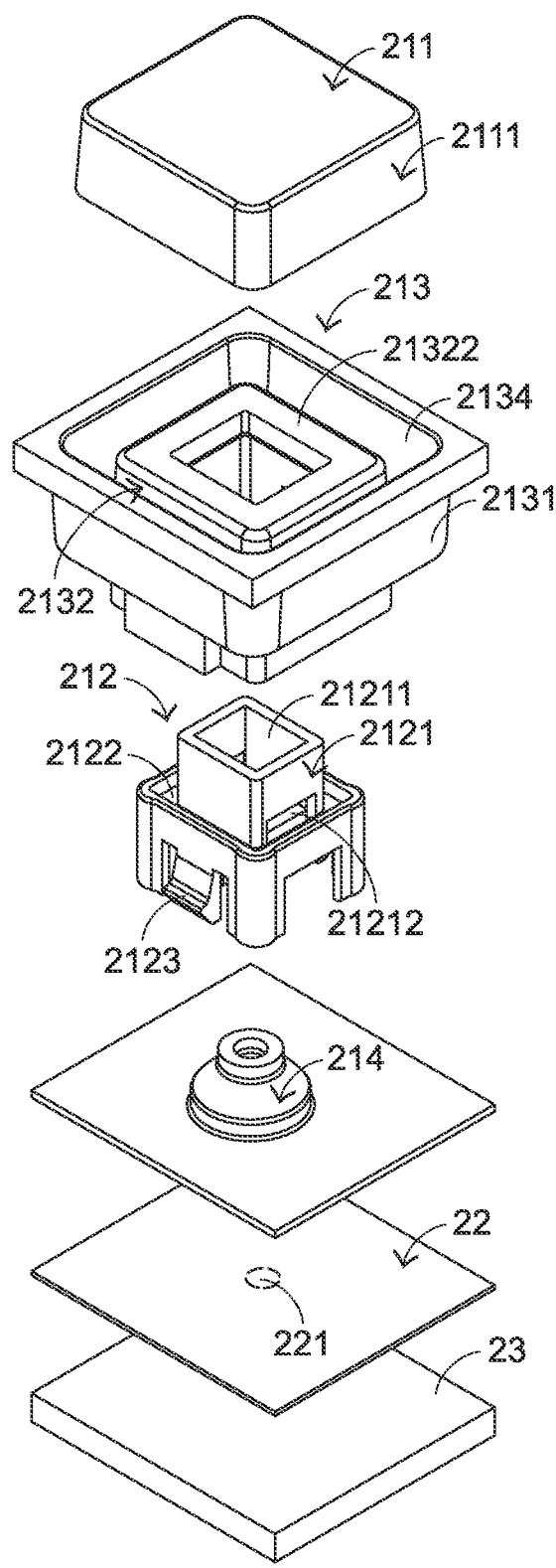
FIG. 7 is a schematic exploded view illustrating a portion of the keyboard device as shown in FIG. 5.

Please refer to FIGS. 5, 6 and 7. FIG. 5 is a schematic perspective view illustrating the outer appearance of a keyboard device according to an embodiment of the present invention. FIG. 6 is a schematic perspective view illustrating a portion of the keyboard device as shown in FIG. 5. FIG. 7 is a schematic exploded view illustrating a portion of the keyboard device as shown in FIG. 5. For succinctness, only one key structure and the related components are shown in FIGS. 6 and 7. In practice, the keyboard device comprises more than one key structure.

The keyboard device 2 comprises plural key structures 21, a membrane circuit board 22 and a base plate 23. The membrane circuit board 22 is located under the plural key structures 21. The plural key structures 21 and the membrane circuit board 22 are supported by the base plate 23. These key structures 21 are classified into some types, e.g., ordinary keys, numeric keys and function keys. When one of the key structures 21 is depressed by the user's finger, a corresponding key signal is generated to the computer (not shown), and thus the computer executes a function corresponding to the depressed key structure. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

Figure 8:
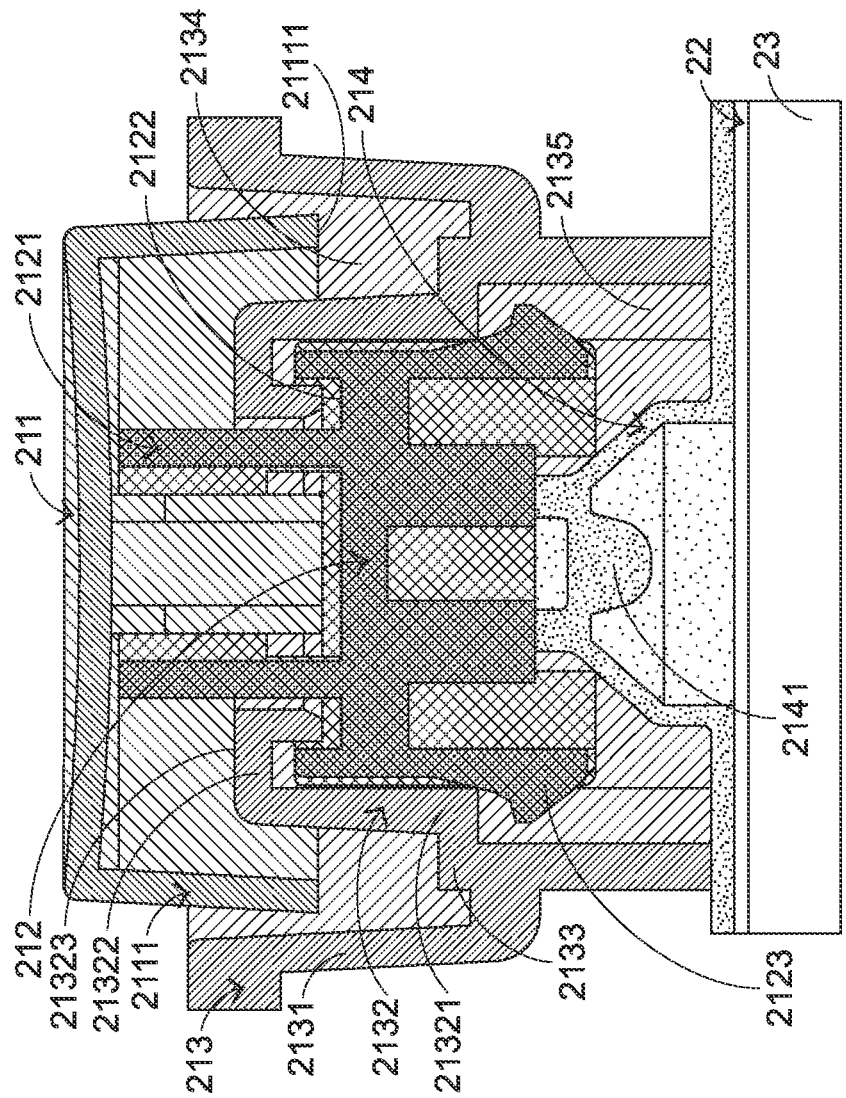
FIG. 8 is a schematic cross-sectional view illustrating a portion of the keyboard device as shown in FIG. 6 and taken along the line BB.
Figure 9:
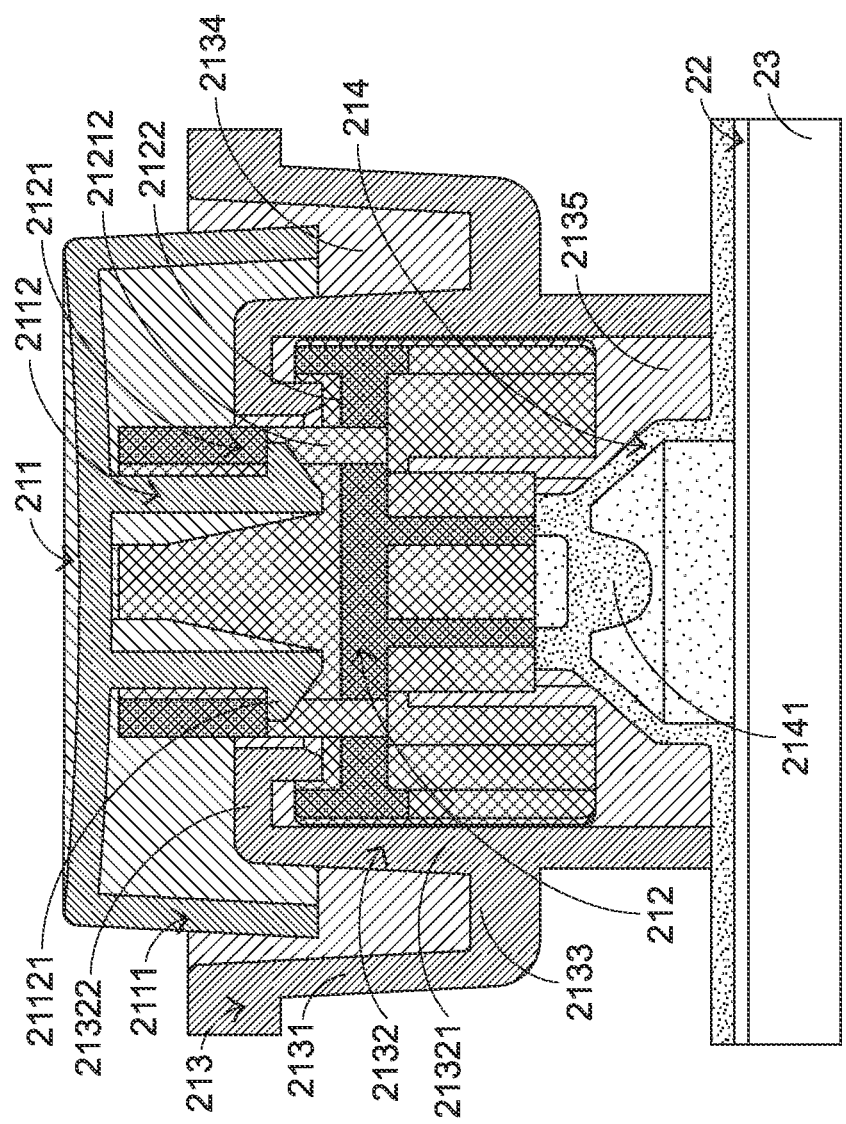
FIG. 9 is a schematic cross-sectional view illustrating a portion of the keyboard device as shown in FIG. 6 and taken along the line CC.

Please refer to FIGS. 8 and 9. FIG. 8 is a schematic cross-sectional view illustrating a portion of the keyboard device as shown in FIG. 6 and taken along the line BB. FIG. 9 is a schematic cross-sectional view illustrating a portion of the keyboard device as shown in FIG. 6 and taken along the line CC. Each key structure 21 comprises a keycap 211, a plunger structure 212, a key pedestal 213 and an elastic element 214. The plunger structure 212 comprises a post part 2121 and a plunger dust-storage chamber 2122. The plunger dust-storage chamber 2122 opens to the upward side. The post part 2121 is connected with the plunger dust-storage chamber 2122 and protruded upwardly from the plunger dust-storage chamber 2122. Moreover, the post part 2121 is connected with the keycap 211.

In an embodiment, the key pedestal 213 comprises an outer wall 2131, a vertical partition wall 2132 and a horizontal partition wall 2133. A pedestal dust-storage chamber 2134 and a guiding chamber 2135 are defined by the outer wall 2131, the vertical partition wall 2132 and the horizontal partition wall 2133 collaboratively. The post part 2121 of the plunger structure 212 is inserted upwardly into the pedestal dust-storage chamber 2134 through the guiding chamber 2135. The plunger structure 212 is enclosed by the vertical partition wall 2132. A first end 21321 of the vertical partition wall 2132 is connected with the horizontal partition wall 2133. A second end 21322 of the vertical partition wall 2132 is bent toward the plunger dust-storage chamber 2122 of the plunger structure 212.

Due to the above structural design, at least a portion of the keycap 211 is movable within the pedestal dust-storage chamber 2134, and at least a portion of the plunger structure 212 is movable within the guiding chamber 2135. That is, the guiding chamber 2135 can guide the movement of the plunger structure 212. The membrane circuit board 22 comprises a membrane switch 221 corresponding to the key structure 21. The elastic element 214 is arranged between the plunger structure 212 and the membrane circuit board 22. Moreover, the elastic element 214 comprises a contacting part 2141 to push the membrane switch 221.

In this embodiment, the keycap 211 and the plunger structure 212 are individual components. Moreover, the keycap 211 and the plunger structure 212 can be combined together. Moreover, the keycap 211 comprises a keycap skirt part 2111 and a keycap coupling part 2112. The keycap skirt part 2111 is protruded downwardly from a lateral edge of the keycap 211. The keycap coupling part 2112 is protruded downwardly from a bottom surface of the keycap 211. A least a portion of the keycap skirt part 2111 is disposed within the pedestal dust-storage chamber 2134. The post part 2121 of the plunger structure 212 has an opening 21211. The keycap coupling part 2112 of the keycap 211 is inserted into the post part 2121 through the opening 21211. The lateral edge of the keycap coupling part 2112 of the keycap 211 has a hook 21121. The post part 2121 of the plunger structure 212 comprises a perforation 21212 corresponding to the hook 21121. After the keycap coupling part 2112 of the keycap 211 is inserted into the post part 2121 of the plunger structure 212, the hook 21121 of the keycap coupling part 2112 is engaged with the perforation 21212 of the post part 2121. Consequently, the keycap 211 and the plunger structure 212 are combined together.

The operations of the keyboard device 2 will be described as follows. While the keycap 211 of the key structure 21 is depressed, the keycap 211 is moved downwardly relative to the pedestal dust-storage chamber 2134 of the key pedestal 213. Since the plunger structure 212 is connected with the keycap 211, the plunger structure 212 is synchronously moved downward relative to the guiding chamber 2135 of the key pedestal 213. Since the bottom side of the plunger structure 212 is contacted with the elastic element 214, the elastic element 214 is compressed and the corresponding membrane switch 221 of the membrane circuit board 22 is contacted and triggered by a contacting part 2141 of the elastic element 214. Since the corresponding membrane switch 221 is triggered, and the keyboard device 2 generates a corresponding key signal. When the keycap 211 is no longer depressed, the plunger structure 212 is moved upwardly relative to the guiding chamber 2135 of the key pedestal 213 in response to an elastic force of the elastic element 214. Since the keycap 211 is connected with the plunger structure 212, the keycap 211 is synchronously moved upwardly relative to the pedestal dust-storage chamber 2134 of the key pedestal 213. Consequently, the keycap 211 is returned to its original position.

Moreover, the plunger structure 212 further comprises a lateral wing part 2123. The lateral wing part 2123 is protruded from the plunger structure 212 along a lateral direction. The lateral wing part 2123 is located under the horizontal partition wall 2133 of the key pedestal 213. Due to the interference between the lateral wing part 2123 and the horizontal partition wall 2133 of the key pedestal 213, at least a portion of the plunger structure 212 is limited within the guiding chamber 2135. For enhancing the tactile feel of depressing the keycap 211, the plunger structure 212 is made of thermoplastic material. Preferably but not exclusively, the thermoplastic material is polyoxymethylene (POM).

Figure 10:
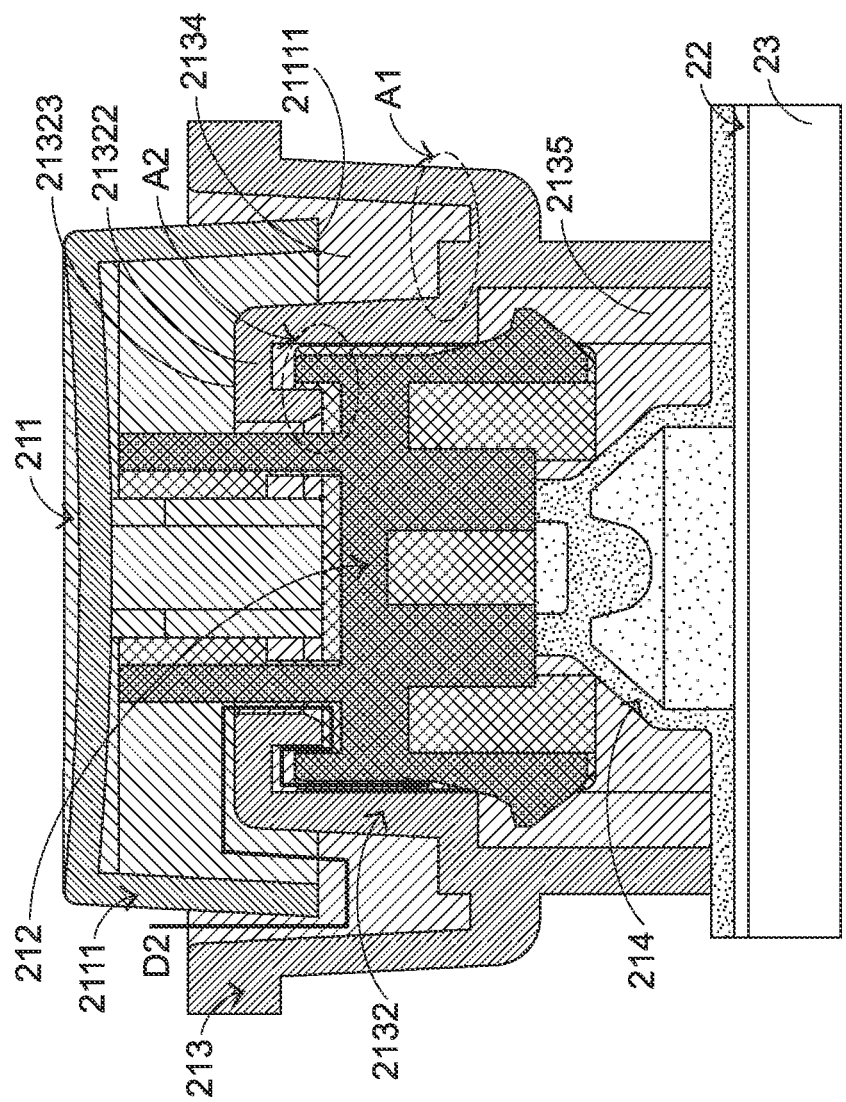
FIG. 10 schematically illustrates the path of the dust to enter the keyboard device as shown in FIG. 6.

Due to above structural design, the dust-proof capability of the keyboard device 2 is enhanced. FIG. 10 schematically illustrates the path of the dust to enter the keyboard device as shown in FIG. 6. As shown in FIG. 10, the dust enters the keyboard device 2 along the path D2 indicated by the arrowed direction. Due to the dust path D2 as shown in FIG. 10, the length of the dust to enter from the use environment to the guiding chamber 2135 of the key pedestal 213 is extended. After the dust enters the key structure 21 through the gap between the keycap 211 and the key pedestal 213, the pedestal dust-storage chamber 2134 of the key pedestal 213 provides a first dust storage region A1, and the plunger dust-storage chamber 2122 of the plunger structure 212 provides a second dust storage region A2. Since the second end 21322 of the vertical partition wall 2132 is bent toward the plunger dust-storage chamber 2122 of the plunger structure 212, the second end 21322 of the vertical partition wall 2132 can block a greater portion of dust from entering the guiding chamber 2135 of the key pedestal 213.

As mentioned above, the second end 21322 of the vertical partition wall 2132 is bent toward the plunger dust-storage chamber 2122 of the plunger structure 212. More preferably, the second end 21322 of the vertical partition wall 2132 is further inserted into the plunger dust-storage chamber 2122 of the plunger structure 212, and a bottom surface 21111 of the keycap skirt part 2111 of the keycap 211 is located at the level lower than a top surface 21323 of the vertical partition wall 2132 of the key pedestal 213. In such way, the dust path D2 is turned and diverted many times. Consequently, the difficulty of entering the dust into the guiding chamber 2135 of the key pedestal 213 is increased. Since it is difficult for the dust to enter the guiding chamber 2135 of the key pedestal 213, the drawbacks of the conventional technologies are overcome. For example, since the dust is not readily accumulated on the keyboard device 2, the operating tactile feel is enhanced, the elastic element 214 is not aged prematurely, and the poor contact situation is avoided. Consequently, the use life of the keyboard device 2 is prolonged.

In the above embodiment of the keyboard device 2, the hook 21121 at the lateral edge of the keycap coupling part 2112 is inserted into the perforation 21212 of the post part 2121 of the plunger structure 212 and engaged with the post part 2121. It is noted that numerous modifications and alterations may be made while retaining the teachings of the invention. For example, the way of combining the keycap 211 and the plunger structure 212 is not restricted. In another embodiment, a perforation is formed in the lateral edge of the keycap coupling part 2112 of the keycap 211, and the post part 2121 of the plunger structure 212 has a hook corresponding to the perforation. After the keycap coupling part 2112 of the keycap 211 is inserted into the post part 2121 of the plunger structure 212, the keycap 211 and the plunger structure 212 are combined together through the engagement between the hook of the post part 2121 and the perforation in the lateral edge of the keycap coupling part 2112.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
   a keycap;
   a plunger structure comprising a post part and a plunger dust-storage chamber, wherein the plunger dust-storage chamber opens to an upward side, and the post part is connected between the keycap and the plunger dust-storage chamber;
   a key pedestal comprising an outer wall, a vertical partition wall and a horizontal partition wall, wherein a pedestal dust-storage chamber and a guiding chamber are defined by the outer wall, the vertical partition wall and the horizontal partition wall collaboratively, wherein a first end of the vertical partition wall is connected with the horizontal partition wall, and a second end of the vertical partition wall is bent toward the plunger dust-storage chamber; and
   an elastic element located under the plunger structure, and comprising a contacting part, wherein while the keycap is depressed, the keycap is moved downwardly within the pedestal dust-storage chamber, the plunger structure is moved downwardly within the guiding chamber, and the elastic element is compressed, so that a membrane switch of a keyboard device is triggered by the contacting part, wherein the plunger structure further comprises a lateral wing part, and the lateral wing part is protruded from the plunger structure along a lateral direction and located under the horizontal partition wall, wherein at least a portion of the plunger structure is limited within the guiding chamber according to an interference between the lateral wing part and the horizontal partition wall.

2. The key structure according to claim 1, wherein the keycap comprises a keycap skirt part, wherein the keycap skirt part is protruded downwardly from a lateral edge of the keycap, and at least a portion of the keycap skirt part is disposed within the pedestal dust-storage chamber.

3. The key structure according to claim 2, wherein a bottom surface of the keycap skirt part is located at a level lower than a top surface of the vertical partition wall.

4. The key structure according to claim 1, wherein the post part has an opening, and the keycap comprises a keycap coupling part, wherein the keycap coupling part is protruded downwardly from a bottom surface of the keycap, and the keycap coupling part is inserted into the post part through the opening, so that the keycap and the plunger structure are combined together.

5. The key structure according to claim 4, wherein one of the post part and the keycap coupling part comprises a hook, and the other of the post part and the keycap coupling part comprises a perforation corresponding to the hook, wherein the hook is engaged with the perforation, so that the keycap and the plunger structure are combined together.

6. The key structure according to claim 1, wherein the plunger structure is enclosed by the vertical partition wall, and the post part is inserted upwardly into the pedestal dust-storage chamber through the guiding chamber.

7. The key structure according to claim 1, wherein the second end of the vertical partition wall is further inserted into the plunger dust-storage chamber.

8. The key structure according to claim 1, wherein the plunger structure is made of thermoplastic material.

9. A keyboard device, comprising:
a membrane circuit board comprising a membrane switch; and
a key structure corresponding to the membrane switch, wherein the key structure comprises:
a keycap;
a plunger structure comprising a post part and a plunger dust-storage chamber, wherein the plunger dust-storage chamber opens to an upward side, and the post part is connected between the keycap and the plunger dust-storage chamber;
a key pedestal comprising an outer wall, a vertical partition wall and a horizontal partition wall, wherein a pedestal dust-storage chamber and a guiding chamber are defined by the outer wall, the vertical partition wall and the horizontal partition wall collaboratively, wherein a first end of the vertical partition wall is connected with the horizontal partition wall, and a second end of the vertical partition wall is bent toward the plunger dust-storage chamber; and
an elastic element located under the plunger structure, and comprising a contacting part, wherein while the keycap is depressed, the keycap is moved downwardly within the pedestal dust-storage chamber, the plunger structure is moved downwardly within the guiding chamber, and the elastic element is compressed, so that the membrane switch is triggered by the contacting part,
wherein the plunger structure further comprises a lateral wing part, and the lateral wing part is protruded from the plunger structure along a lateral direction and located under the horizontal partition wall, wherein at least a portion of the plunger structure is limited within the guiding chamber according to an interference between the lateral wing part and the horizontal partition wall.

10. The keyboard device according to claim 9, wherein the keycap comprises a keycap skirt part, wherein the keycap skirt part is protruded downwardly from a lateral edge of the keycap, and at least a portion of the keycap skirt part is disposed within the pedestal dust-storage chamber.

11. The keyboard device according to claim 10, wherein a bottom surface of the keycap skirt part is located at a level lower than a top surface of the vertical partition wall.

12. The keyboard device according to claim 9, wherein the post part has an opening, and the keycap comprises a keycap coupling part, wherein the keycap coupling part is protruded downwardly from a bottom surface of the keycap, and the keycap coupling part is inserted into the post part through the opening, so that the keycap and the plunger structure are combined together.

13. The keyboard device according to claim 12, wherein one of the post part and the keycap coupling part comprises a hook, and the other of the post part and the keycap coupling part comprises a perforation corresponding to the hook, wherein the hook is engaged with the perforation, so that the keycap and the plunger structure are combined together.

14. The keyboard device according to claim 9, wherein the plunger structure is enclosed by the vertical partition wall, and the post part is inserted upwardly into the pedestal dust-storage chamber through the guiding chamber.

15. The keyboard device according to claim 9, wherein the second end of the vertical partition wall is further inserted into the plunger dust-storage chamber.

16. The keyboard device according to claim 9, wherein the plunger structure is made of thermoplastic material.

17. The keyboard device according to claim 9, further comprising a base plate, wherein the membrane circuit board and the key structure are supported by the base plate.

* * * * *